United States Patent
Carroll

(10) Patent No.: US 9,750,198 B2
(45) Date of Patent: *Sep. 5, 2017

(54) CUTTER APPARATUS

(71) Applicant: Limb Beaver, LLC, Fair Oaks, AR (US)

(72) Inventor: Roger Carroll, Amory, MS (US)

(73) Assignee: LIMB BEAVER, LLC, Fair Oaks, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,474

(22) Filed: Aug. 1, 2016

(65) Prior Publication Data

US 2016/0338271 A1 Nov. 24, 2016

Related U.S. Application Data

(63) Continuation of application No. 14/286,677, filed on May 23, 2014, now Pat. No. 9,402,350.

(Continued)

(51) Int. Cl.
*A01G 3/053* (2006.01)
*A01G 3/08* (2006.01)
(Continued)

(52) U.S. Cl.
CPC ........... *A01G 3/0535* (2013.01); *A01D 34/43* (2013.01); *A01D 34/53* (2013.01); *A01D 34/64* (2013.01);
(Continued)

(58) Field of Classification Search
CPC .... A01D 1/08; A01D 2023/028; A01D 34/42; A01D 34/43; A01D 34/52; A01D 34/53; A01D 34/63; A01D 34/66; A01D 34/665; A01D 34/733; A01D 34/736; A01G 3/0426; A01G 4/35; A01G 3/08
(Continued)

(56) References Cited

U.S. PATENT DOCUMENTS 3,913,304 A 10/1975 Jodoin
4,074,510 A * 2/1978 Teagle ................. A01D 34/435
56/12.7

(Continued)

FOREIGN PATENT DOCUMENTS

WO 98/06251 2/1998
WO 03/101180 12/2003
WO 2013/106560 7/2013

*Primary Examiner* — John G Weiss
(74) *Attorney, Agent, or Firm* — Dunlap Codding, P.C.

(57) ABSTRACT

A cutter apparatus comprising a frame having a mounting member connectable to a piece of prime mover equipment; a cutter assembly connected to the frame, the cutter assembly comprising a support member having a first end; a drive shaft having a first end journaled to the first end of the support member; and a plurality of discrete cutter members stacked on the drive shaft so as to be engaged with an adjacent one of the cutter members, each of the cutter members having at least one cutting edge; and a drive assembly connected to the drive shaft in a way that activation of the drive assembly causes the drive shaft to rotate and thereby rotate the cutter members. The frame may have a base and an extension arm pivotally connected to the base. The support member may be pivotally connected to the extension arm.

4 Claims, 7 Drawing Sheets

Related U.S. Application Data

(60) Provisional application No. 61/826,991, filed on May 23, 2013.

(51) Int. Cl.
*A01D 34/43* (2006.01)
*A01D 34/53* (2006.01)
*A01D 34/64* (2006.01)

(52) U.S. Cl.
CPC ............... *A01G 3/053* (2013.01); *A01G 3/08* (2013.01); *A01G 3/085* (2013.01)

(58) Field of Classification Search
USPC ...... 56/234, 233, 256, 249, 12.4, 12.5, 15.2; 83/672, 855
See application file for complete search history.

(56) References Cited

U.S. PATENT DOCUMENTS

| | | | |
|---|---|---|---|
| 4,956,965 A * | 9/1990 | Parsons, Jr. .......... | A01D 34/863 56/10.4 |
| 5,003,759 A | 4/1991 | Brown | |
| 5,210,997 A * | 5/1993 | Mountcastle, Jr. .. | A01D 34/866 56/11.9 |
| 5,375,398 A * | 12/1994 | McClymonds ...... | A01D 34/866 56/15.2 |
| 5,775,075 A * | 7/1998 | Dannar ................ | A01D 34/866 56/15.2 |
| 6,192,665 B1 * | 2/2001 | Asselin ................ | A01D 34/866 56/12.1 |
| 6,543,210 B2 | 4/2003 | Rostoucher et al. | |
| 6,640,528 B1 * | 11/2003 | Rowland ................ | E02F 3/964 56/15.2 |
| 7,431,059 B2 | 10/2008 | Cochran | |
| 7,748,421 B2 | 7/2010 | Everett | |
| 7,850,107 B2 | 12/2010 | Schafer | |
| 7,967,044 B2 | 6/2011 | Labbe et al. | |
| 2005/0102778 A1 | 5/2005 | Gregerson | |
| 2005/0102843 A1* | 5/2005 | Jiang ..................... | A01D 34/53 30/240 |
| 2008/0178569 A1 | 7/2008 | Hamel et al. | |
| 2012/0067188 A1* | 3/2012 | Denis .................... | A01D 34/52 83/665 |

\* cited by examiner

CUTTER APPARATUS

CROSS REFERENCE TO RELATED APPLICATIONS

This application is a continuation of U.S. Ser. No. 14/286,677, filed May 23, 2014, which claims priority to U.S. Provisional Ser. No. 61/826,991, filed May 23, 2013; all of which are hereby expressly incorporated herein by reference.

BACKGROUND

Cutter devices may be used to cut trees, bushes, and other types of vegetation. Vegetation cutting devices are often used to clear and maintain road rights-of-way and fence lines. Prior art brush cutters and tree trimmers include rotary mowers, saw blades, and mulchers. Rotary mowers are mounted on the hydraulic boom of a tractor. One problem associated with rotary mowers is the likelihood that the mower will expel cut materials at a high rate of speed, creating a safety hazard for individuals or vehicles near the mowers. The rotary mowers require frequent maintenance and sharpening of the mower blades, which may be difficult and time consuming.

Other brush cutters include a series of spinning saw blades affixed to a hydraulic boom. The saw blade cutters are slow and require frequent repositioning of the prime mover vehicle to reach the desired vegetation, and sharpening the saw blades is a frequent, time consuming process. Additionally, the saw blade cutters can only cut a narrow swath of vegetation at one time.

Hydraulic mulchers are another form of brush cutters. Mulchers often use a large number of teeth affixed to a rotating drum. The teeth are expensive and must be frequently replaced, which is a time consuming process. Additionally, mulchers cut a narrow swath and cut slowly. Hydraulic mulchers are also very heavy and put a great strain on the prime mover vehicle to which they are attached.

Accordingly, a need exists for a cutter apparatus that can be easily and variably positioned and that can quickly and safely cut large swaths of vegetation while improving cutting mechanism maintenance life and ease. It is to such an apparatus that the inventive concepts disclosed herein are directed.

SUMMARY OF THE INVENTION

The present disclosure relates to a cutter apparatus for use, for example, in cutting brush and trees. The cutter apparatus may comprise a frame having a mounting member connectable to a piece of prime mover equipment and a cutter assembly connected to the frame. The cutter assembly may comprise a support member having a first end and a second end, a drive shaft having a first end and a second end, the first end of the drive shaft journaled to the first end of the support member, and a plurality of discrete cutter members stacked on the drive shaft so as to be engaged with an adjacent one of the cutter members, each of the cutter members having at least one cutting edge. The cutter apparatus may further comprise a drive assembly connected to the drive shaft in a way that activation of the drive assembly causes the drive shaft to rotate and thereby rotate the cutter members. The cutter apparatus may use the hydraulic power source of the prime mover vehicle to power the cutter apparatus.

The frame may comprise a base and an extension arm, the extension arm having a first end pivotally connected to the base and a second end extending from the base. The first end of the support member may be pivotally connected to the second end of the extension arm. In one embodiment, the base has a vertical axis and the extension arm is pivotally connected to the base about the vertical axis of the base, and the extension arm has a horizontal axis and the first end of the support member is pivotally connected to the second end of the extension arm about the horizontal axis of the extension arm.

In one embodiment, the cutter members are slideable along the drive shaft when the first end of the support member is disconnected from the first end of the drive shaft.

In one embodiment, the cutter members each have a body with a top side, a bottom side, and a through-hole extending from the top side to the bottom side and centered in the body, the through-hole slidably receivable of the drive shaft, the cutter members further having a first cutting edge and a second cutting edge arranged in a diametrically opposed relationship and extending from the top side to the bottom side in a parallel relationship to one another.

In one embodiment, the cutter members may be stacked on the drive shaft in a way that the first cutting edges and the second cutting edges are arranged in a helical pattern.

In one embodiment, the bottom side of the body of each of the cutter members has a notch for matingly receiving the top side of the adjacent cutter member.

BRIEF DESCRIPTION OF THE DRAWINGS

The accompanying drawings, which are incorporated in and constitute a part of this specification, illustrate one or more implementations described herein and, together with the description, explain these implementations.

DETAILED DESCRIPTION OF EXEMPLARY EMBODIMENTS

Figure 1:
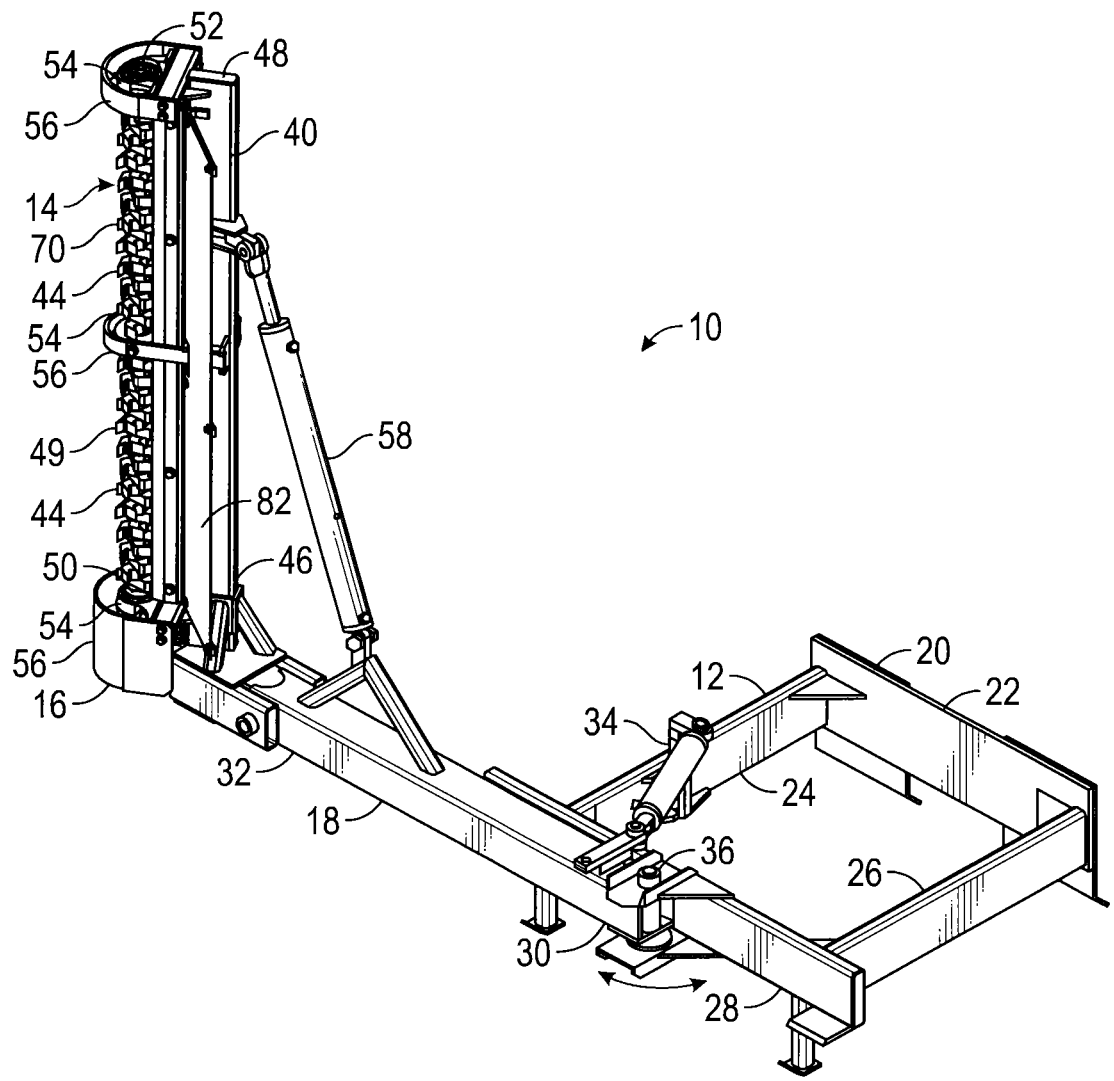
FIG. 1 is a perspective view of a cutter apparatus constructed in accordance with the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
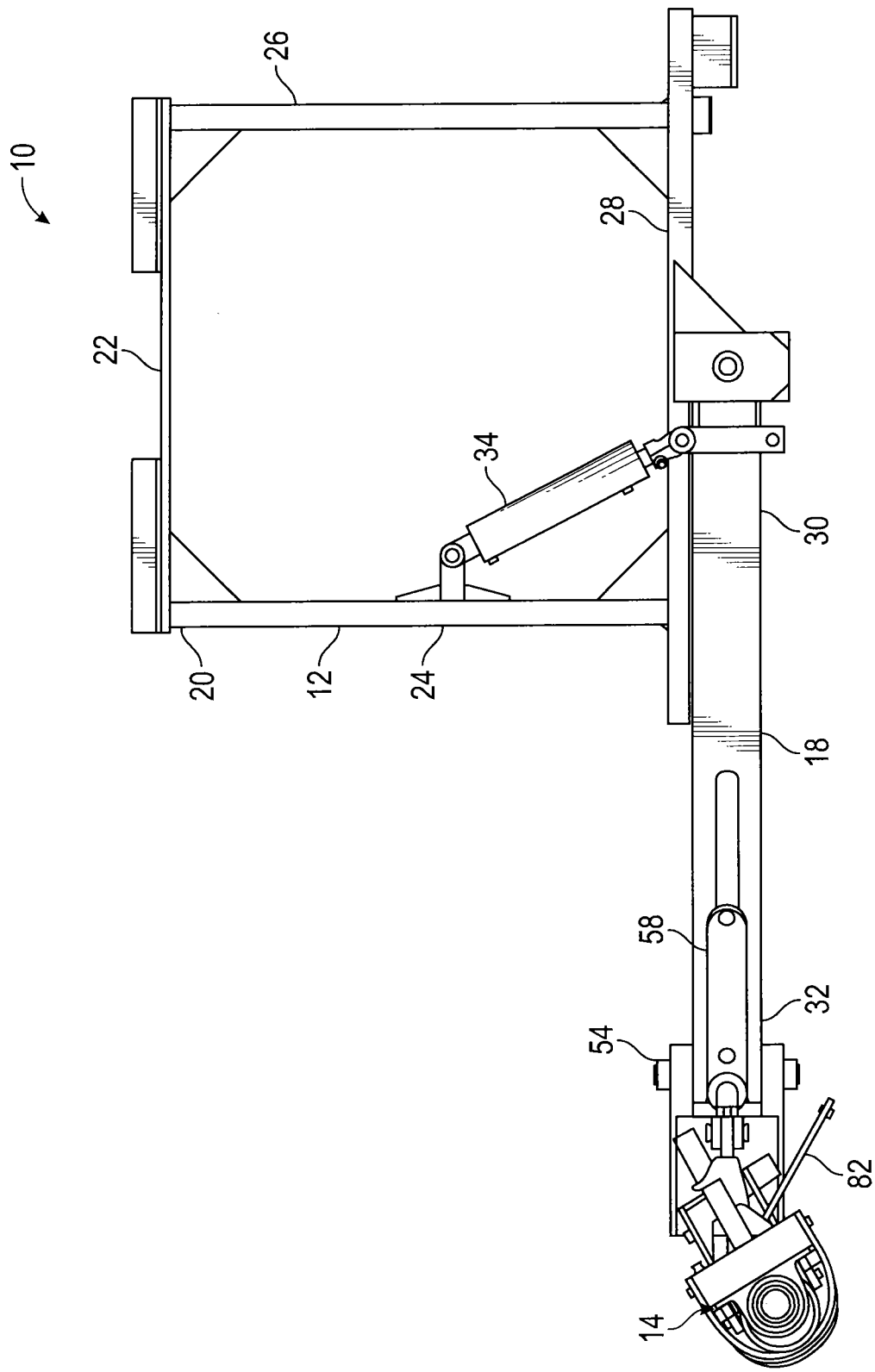
FIG. 2 is a top plan view of the cutter apparatus of FIG. 1.
Figure 3:
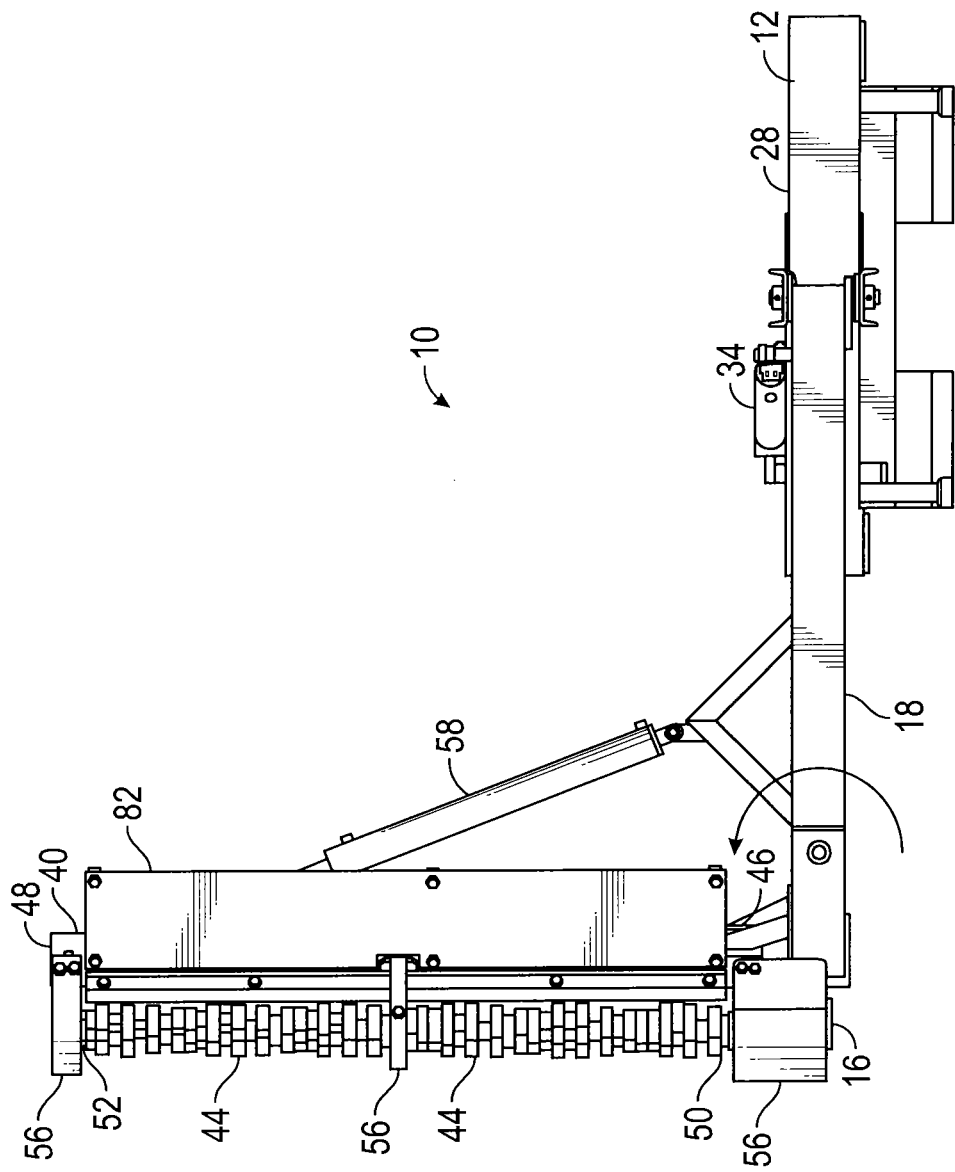
FIG. 3 is a side elevational view of the cutter apparatus of FIG. 1.

Referring now to FIGS. 1-3, a cutter apparatus 10 constructed in accordance with the inventive concepts disclosed herein is illustrated. The cutter apparatus 10 may be used for cutting brush or timber, for example. Broadly, the cutter apparatus 10 may include a frame 12 connectable to a piece of prime mover equipment (not shown), a cutter assembly 14 connected to the frame 12, and a drive assembly 16 connected to the cutter assembly 14.

Prime mover equipment is well known in the art. Non-exclusive examples include skid steers, compact track loaders, tractors, excavators, truck booms, telehandlers, backhoes, construction equipment, and may include various three point hitch sizes and styles and other equipment with booms or hydraulic availability. The attachment configuration for such prime mover equipment is well known to those having ordinary skill in the art and, as such, will not be further described herein.

The frame 12 may include an extension arm 18 and a base 20 connectable to the piece of prime mover equipment. The base 20 may include a mounting member 22 for mounting the cutter apparatus 10 to the piece of prime mover equipment, a pair of horizontal supports 24, 26, and a connection member 28 between the horizontal supports 24, 26. However, it will be understood that the frame 12 of the cutter apparatus 10 may be configured in any suitable form capable of supporting the cutter assembly 14. In one embodiment, the frame 12 may be formed as a part of the piece of prime mover equipment such that the piece of prime mover equipment serves as the frame 12.

The extension arm 18 of the frame 12 may have a first end 30 pivotally connected to the base 20 and a second end 32 extending from the base 20. In one example, the base 20 has a vertical axis and the extension arm 18 is pivotally connected to the base 20 about the vertical axis of the base 20. The extension arm 18 may be composed of square steel tubing as shown; however, it will be understood that other materials may be used. A hydraulic cylinder 34 may be attached to the extension arm 18 and the base 20 to pivot the extension arm 18 about the base 20 when the hydraulic cylinder 34 is actuated. Other methods of moving the extension arm 18 may be used, including but not limited to use of a gear and chain drive system (not shown). Additionally or alternately, the extension arm 18 may be manually moved. One or more bushing 36 may be used to facilitate pivoting the extension arm 18 about the base 20.

The cutter assembly 14 may be pivotally connected to the extension arm 18 of the frame 12. The cutter assembly 14 may include a support member 40, a drive shaft 42 (FIG. 4B) connected to the support member 40, and a plurality of cutter members 44 stacked on the drive shaft 42. The support member 40 has a first end 46 and a second end 48. The first end 46 of the support member 40 may be pivotally connected to second end 32 of the extension arm 18. In one embodiment, the extension arm 18 has a horizontal axis, and the first end 46 of the support member 40 is pivotally connected to the second end 32 of the extension arm 18 about the horizontal axis of the extension arm 18.

In one embodiment, a hydraulic cylinder 58 may be connected to the cutter assembly 14 to pivot the cutter assembly 14 about the second end 32 of the extension arm 18. The cylinders 34, 58 may be powered by any suitable hydraulic power system (not shown). The cylinders 34, 58 may be powered by the piece of prime mover equipment. Because the use of hydraulic circuits, as well as their various components, is well known in the art, the hydraulic hosing and components used with the present inventive concepts have been omitted from the drawings for the sake of clarity.

The support member 40 may be composed of square steel tubing as shown, but it will be understood that other materials may be used. The length and size of the support member 40 can vary depending on the type of utilization of the cutter apparatus 10. It will be understood that the support member 40 may comprise more or fewer components than shown as long as the support member 40 is capable of supporting the drive shaft 42 and cutter members 44.

In one embodiment, the cutter assembly 14 may include a debris guard 60. The debris guard 60 may block debris from the cutter assembly 14 from being discharged toward the piece of prime mover equipment. The debris guard 60 may be connected to the support member 40, or to any part of the cutter apparatus 10 where the debris guard 60 is able to block debris.

The drive shaft 42 also has a first end 50 and a second end 52. At least the first end 46 of the support member 40 is journaled to the first end 50 of the drive shaft 42. Additional areas of the support member 40 and the drive shaft 42 may also be journaled, such as the second end 48 of the support member 40 and the second end 52 of the drive shaft 42, or one or more mid-point between the first ends 46, 50 and the second ends 48, 52. The support member 40 and the drive shaft 42 may be journaled in any manner, as is well known by those having skill in the art, such as by one or more bearings 54. In one embodiment, one or more pieces of rigid material 56 may be attached in front of the bearings 54 to protect the bearings 54 and prevent interference, such as that caused by debris from cutting.

As illustrated in FIGS. 1, 3, and 4A-5B, the cutter members 44 are stacked on the drive shaft 42 so as to be engaged with an adjacent one of the cutter members 44. Each of the cutter members 44 has a body 62 with a top side 64, a bottom side 66, and a through-hole 68 extending from the top side 64 to the bottom side 66 and centered in the body 62. Each of the cutter members 44 has at least one cutting edge 70. In one embodiment, each of the cutter members 44 has a first cutting edge 70a and a second cutting edge 70b arranged in a diametrically opposed relationship. The first cutting edge 70a and the second cutting edge 70b extend from the top side 64 to the bottom side 66 of the body 62 in a parallel relationship to one another. In one embodiment, the body 62 of the cutter member 44 may be rhomboid or parallelopid shaped.

Figure 4A:
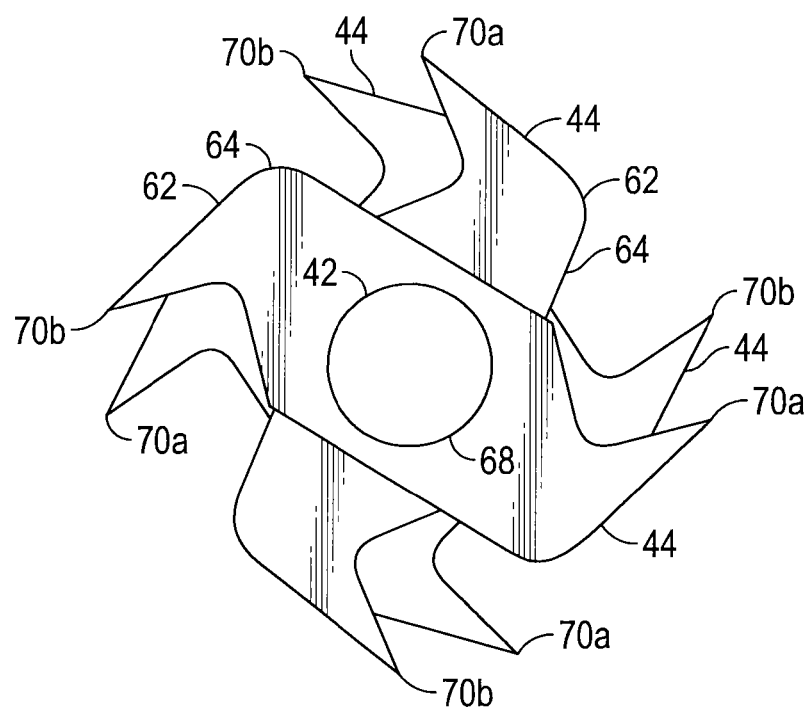
FIG. 4A is a top plan view of a portion of a cutter assembly constructed in accordance with the inventive concepts disclosed herein
Figure 4B:
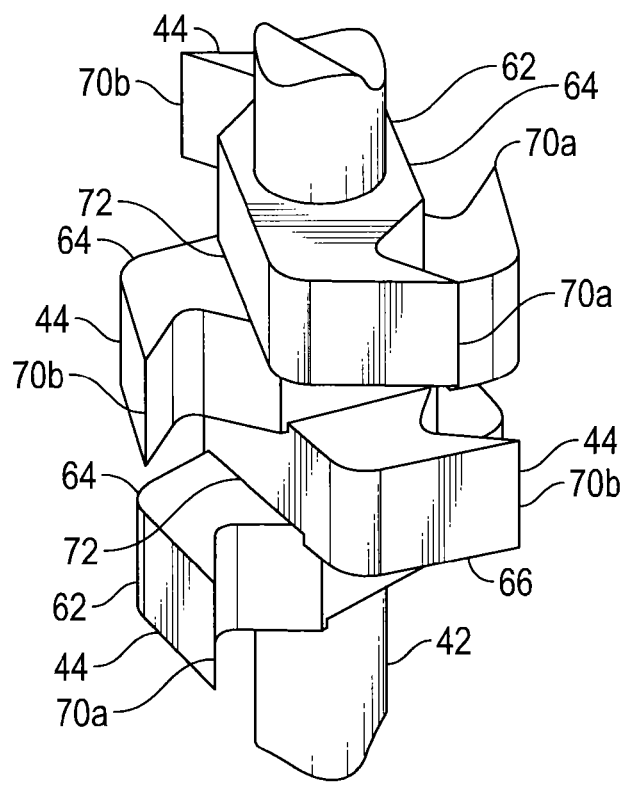
FIG. 4B is a perspective view of the portion of the cutter assembly of FIG. 4A.
Figure 4C:
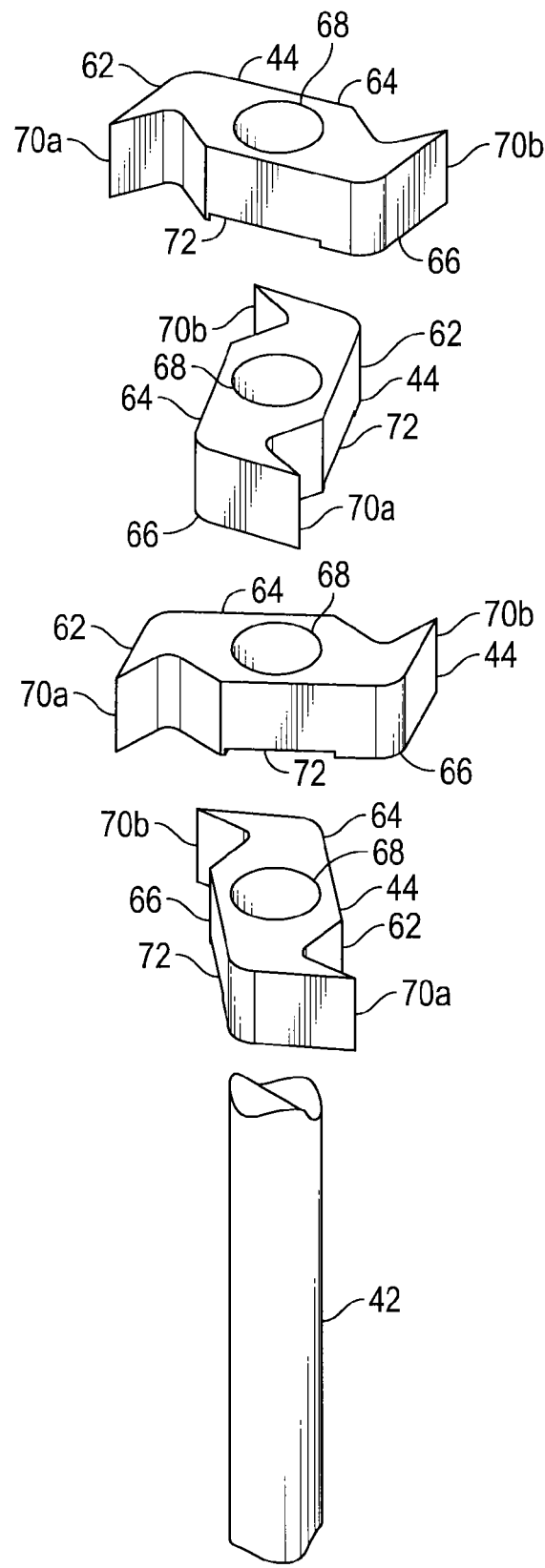
FIG. 4C is an exploded, perspective view of the section of the cutter assembly of FIG. 4A.

As shown in FIGS. 4A-4C, in one embodiment, the cutter members 44 are stacked on the drive shaft 42 in a way that the first cutting edges 70a and the second cutting edges 70b are arranged in a helical pattern. In one embodiment, the cutter members 44 are arranged in a helical pattern so that the cutting edges 70a and 70b are longitudinally offset from one another. By way of example, the first cutting edge 70a of the cutter member 44 may be approximately eighty degrees offset from the first cutting edge 70a of the adjacent cutter member 44, and the second cutting edge 70b of the cutter member 44 may be approximately eighty degrees offset from the second cutting edge 70b of the adjacent cutter member 44. In turn, the first cutting edge 70a of the cutter member 44 may be approximately twenty degrees offset from the second cutting edge 70b of the cutter member 44 engaged with the adjacent cutter member 44.

Figure 5A:
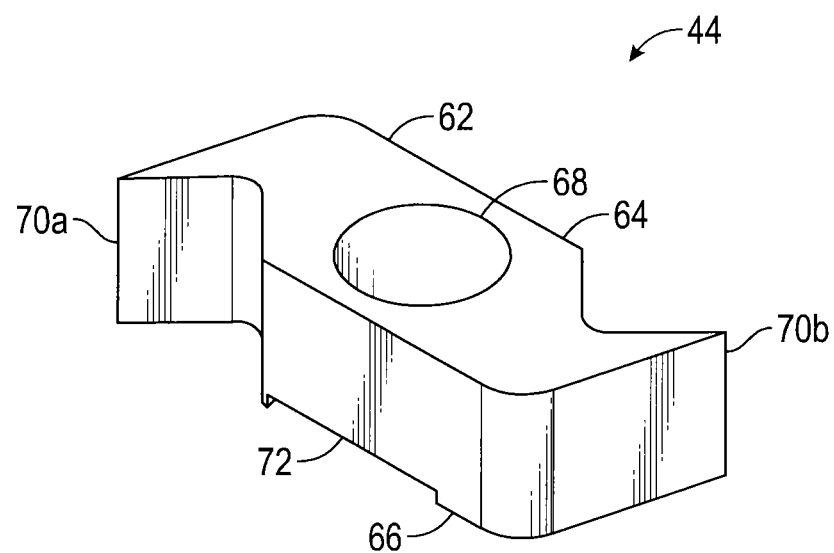
FIG. 5A is a perspective view of a cutter member constructed in accordance with the inventive concepts disclosed herein.
Figure 5B:
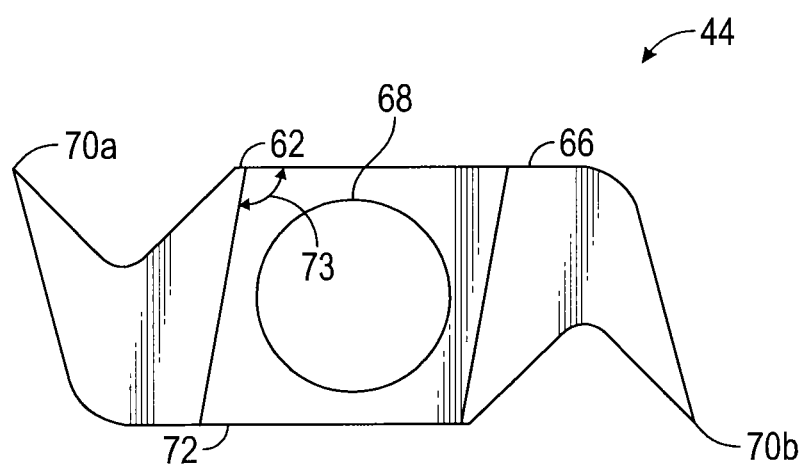
FIG. 5B is a bottom plan view of the cutter member of FIG. 5A.

As shown in FIGS. 5A and 5B, in one embodiment, the bottom side 66 of the body 62 of each of the cutter members 44 has a notch 72 for matingly receiving the top side 64 of the adjacent cutter member 44. The notch 72 may be formed at an angle 73 across the bottom side 66 of the body 62 of the cutter member 44 to achieve the desired angular offset of the cutting edges 70a and 70b of the cutter members 44. In one embodiment, the angle 73 may be approximately one hundred degrees.

The through-hole 68 of the cutter member 44 is slidably receivable of the drive shaft 42. The cutter members 44 are slideable along on the drive shaft 42 when at least the first end 46 or the second end 48 of the support member 40 is disconnected from the drive shaft 42 to facilitate assembly and disassembly.

Figure 6:
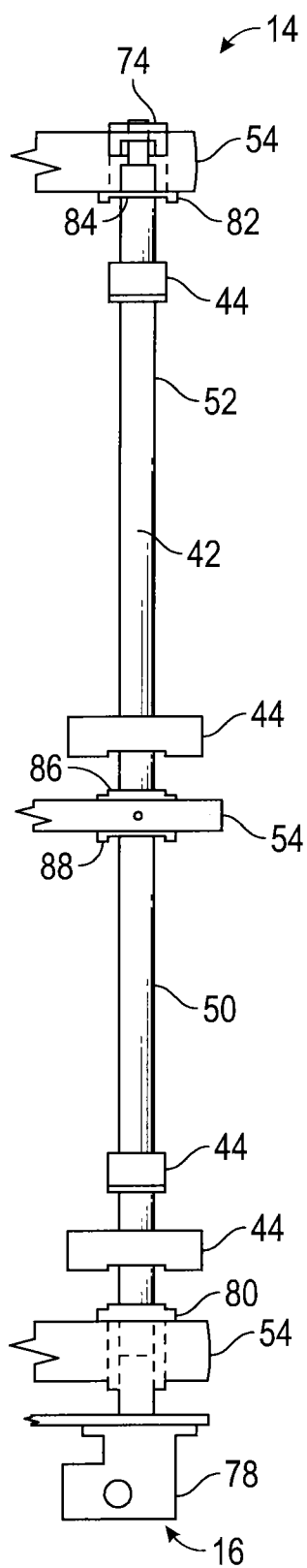
FIG. 6 is a side elevational view of a portion of the cutter assembly and a drive assembly constructed in accordance with the inventive concepts disclosed herein.

Referring now to FIG. 6, in one embodiment, the first end 50 and/or the second end 52 of the drive shaft 42 may be threaded to receive a nut 74. The nut 74 may secure the cutter members 44 from removal from the drive shaft.

In one embodiment, the cutter assembly 14 may include a top hub 82 configured to engage with the top side 64 of a top-most cutter member 44 of the stacked cutter members 44. The top hub 82 may include a notch 84, corresponding to the notch 72 of the cutter member 44, for engaging the top side 64 of the top-most cutter member 44. The top hub 82 may be connected with one of the bearings 54 journaling the drive shaft 42 with the support member 40.

In one embodiment, the cutter assembly 14 may include one or more middle hub 86 configured to engage with the top side 64 of a lower adjacent cutter member 44 and to engage the notch 72 in the bottom side 66 of a higher adjacent cutter member 44 of the stacked cutter members 44. The middle hub 86 may include a notch 88, corresponding to the notch 72 of the cutter member 44, for engaging the top side 64 of the lower adjacent cutter member 44. The middle hub 86 may be connected with one of the bearings 54 journaling the drive shaft 42 with the support member 40.

As shown in FIG. 6, the drive assembly 16 is connected to the drive shaft 42 of the cutter assembly 14 in a way that activation of the drive assembly 16 causes the drive shaft 42 to rotate and in a way that causes the cutter members 44 to rotate.

In one embodiment, the drive assembly 16 may include a drive motor 78 and a bottom hub 80 engaged with the drive motor 78 to transfer rotation to the cutter assembly 14. The bottom hub 80 may be connected with one of the bearings 54 journaling the drive shaft 42 with the support member 40. The bottom hub 80 may be configured to engage with the notch 72 of a bottom-most cutter member 44 of the stacked cutter members 44 such that the bottom hub 80 transfers rotation from the drive motor 78 to the cutter members 44. Further, the bottom hub 80 may be configured to engage with the drive shaft 42 such that the bottom hub 80 transfers rotation from the drive motor 78 to the drive shaft 42, so that the drive shaft 42 and the cutter members 44 rotate at substantially the same rate.

Of course, it will be understood that any drive assembly 16 of suitable power to rotate the drive shaft 42 and cutter members 44 for cutting purposes may be used. The drive assembly 16 may include any other suitable drive mechanism, including, but not limited to, an electric motor, or an internal combustion engine. The drive assembly 16 may be powered through an exterior source. The drive assembly 16 may be powered by the piece of prime mover equipment. The drive assembly 16 may be mounted in any way to the cutter assembly 14 or frame 12 as long as the drive assembly 16 is capable of driving the drive shaft 42 and the cutter members 44.

The cutter apparatus 10 may be controlled and/or powered from the piece of prime mover equipment. For example, the piece of prime mover equipment may be connected to the cutter apparatus 10 for activating and deactivating the drive assembly 16 and pivoting controls (such as cylinders 34, 58), such that an operator of the prime mover equipment may operate the cutter apparatus 10 with controls of the prime mover equipment. The connections between the prime mover equipment and the cutter apparatus 10 may be hydraulic and/or electrical. As this type of control is well known in the art, the connections and control systems will not be further explained herein.

In use, the cutter apparatus 10 may be utilized to cut vegetation, such as to cut trees and brush away from fence rows, roads, rights-of-way, and easements. Initially, the mounting member 22 of the frame 12 of the cutter apparatus 10 may be attached to the piece of prime mover equipment. Hydraulic and/or electrical connections (not shown), well known to those having skill in the art, may be made between the piece of prime mover equipment and the cutter apparatus 10, so as to provide power to and control of the drive assembly 16, and to pivot the extension arm 18 and or the cutter assembly 14, such as with the cylinders 34, 58. The operator may manipulate the height and orientation of the cutter apparatus 10 by pivoting the extension arm 18 and/or the cutter assembly 14. It will be understood that the cutter apparatus 10 may also be raised and lowered with capabilities available on the piece of prime mover equipment, for example, a boom, lift, or elevator (not shown).

The drive assembly 16 is engaged to rotate the drive shaft 42 and the cutter members 44. The operator may operate the piece of prime mover equipment forward such that the cutter assembly 14 engages the vegetation to be cut. The cutter members 44 cut the vegetation and allow it to drop to the ground.

If the cutter members 44 are dulled, an electric grinder may be used to sharpen the cutter members 44 while the cutter members 44 are on the drive shaft 42 of the cutter assembly 14. Alternately, or additionally, the operator may disconnect the support member 40 from the drive shaft 42 and slidably remove one or more of the cutter members 44 for maintenance.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and claimed herein. While the cutter apparatus 10 has been described in the context of vegetation control, it will be understood the cutter apparatus 10 may be used in any environment requiring a cutter device. For example, the cutter apparatus 10 may be adapted for other tasks including but not limited to asphalt milling, rock grinding, lumber milling, agricultural tilling, and other uses.

What is claimed is:

1. A cutter assembly, comprising:
a drive shaft having a first end and a second end; and
a plurality of discrete cutter members stacked on the drive shaft so as to be engaged with an adjacent one of the cutter members, each of the cutter members having at least one cutting edge,
wherein the cutter members are stacked on the drive shaft in a way that the cutting edges are arranged in a helical pattern, and
wherein a bottom side of each of the cutter members has a notch for matingly receiving a top side of the adjacent cutter member.

2. A cutter assembly, comprising:
a support member having a first end and a second end;
a drive shaft having a first end and a second end, the first end of the drive shaft journaled to the first end of the support member;
a plurality of discrete cutter members stacked on the drive shaft so as to be engaged with an adjacent one of the cutter members, each of the cutter members having at least one cutting edge, wherein the cutter members are stacked on the drive shaft in a way that the cutting edges are arranged in a helical pattern, and wherein a bottom side of each of the cutter members has a notch for matingly receiving a top side of the adjacent cutter member; and
a drive assembly connected to the drive shaft in a way that activation of the drive assembly causes the drive shaft to rotate and thereby rotate the cutter members.

3. The cutter assembly of claim 2, wherein the cutter members are slideable along on the drive shaft when the first end of the support member is disconnected from the first end of the drive shaft.

4. A cutter assembly, comprising:
a drive shaft having a first end and a second end; and
a plurality of discrete cutter members stacked on the drive shaft so as to be engaged with an adjacent one of the cutter members, each of the cutter members having a body with a top side, a bottom side, a through-hole extending from the top side to the bottom side and slidably receivable of the drive shaft, a first cutting edge, and a second cutting edge arranged in a diametrically opposed relationship with respect to the first cutting edge, the first cutting edge and the second cutting edge extending from the top side to the bottom side in a parallel relationship to one another,
wherein the cutter members are stacked on the drive shaft in a way that the first cutting edges and the second cutting edges are arranged in a helical pattern, and
wherein the bottom side of the body of each of the cutter members has a notch for matingly receiving the top side of the adjacent cutter member.

* * * * *